(12) United States Patent
Allen

(10) Patent No.: US 8,186,238 B2
(45) Date of Patent: May 29, 2012

(54) MECHANICAL GEAR APPARATUS

(76) Inventor: Ernest W. Allen, Midland, MI (US)

( * ) Notice: Subject to any disclaimer, the term of this patent is extended or adjusted under 35 U.S.C. 154(b) by 855 days.

(21) Appl. No.: 12/287,432

(22) Filed: Oct. 9, 2008

(65) Prior Publication Data
US 2009/0090206 A1    Apr. 9, 2009

Related U.S. Application Data

(60) Provisional application No. 60/998,183, filed on Oct. 9, 2007.

(51) Int. Cl.
*F16H 3/00* (2006.01)
(52) U.S. Cl. .......................... 74/354; 74/413; 74/421 R
(58) Field of Classification Search .................. 74/354, 74/413, 414, 421 R
See application file for complete search history.

(56) References Cited

U.S. PATENT DOCUMENTS

| | | | |
|---|---|---|---|
| 3,107,056 A | 10/1963 | Hunter | |
| 4,312,244 A * | 1/1982 | Barnes et al. | 74/410 |
| 4,337,910 A | 7/1982 | Santoro | |
| 4,723,184 A | 2/1988 | Takai et al. | |
| 4,924,573 A | 5/1990 | Huddleston | |
| 5,058,463 A | 10/1991 | Wannop | |
| 7,118,512 B2 * | 10/2006 | Flugrad et al. | 476/33 |
| 7,181,996 B1 | 2/2007 | Chu | |
| 7,448,293 B2 * | 11/2008 | Li | 74/354 |
| 7,899,387 B2 * | 3/2011 | Ogawa | 399/401 |

* cited by examiner

*Primary Examiner* — Ha D. Ho
(74) *Attorney, Agent, or Firm* — Robert L. McKellar; McKellar IP Law, PLLC

(57) ABSTRACT

A mechanical gear apparatus that provides power transmission wherein a gear that is driven moves only in a forward direction when the driving gear is driven forward or in reverse. It is a mechanical gear apparatus comprising a support base, a drive gear, and, a directional gear assembly comprising three gears and, another configuration in which there is a mechanical gear apparatus comprising a support base, a driven gear, and a directional gear assembly comprising two directional gears and a drive gear. The gears in the mechanical gear apparatus can be substituted by smooth or rough surface rubber rollers.

26 Claims, 7 Drawing Sheets

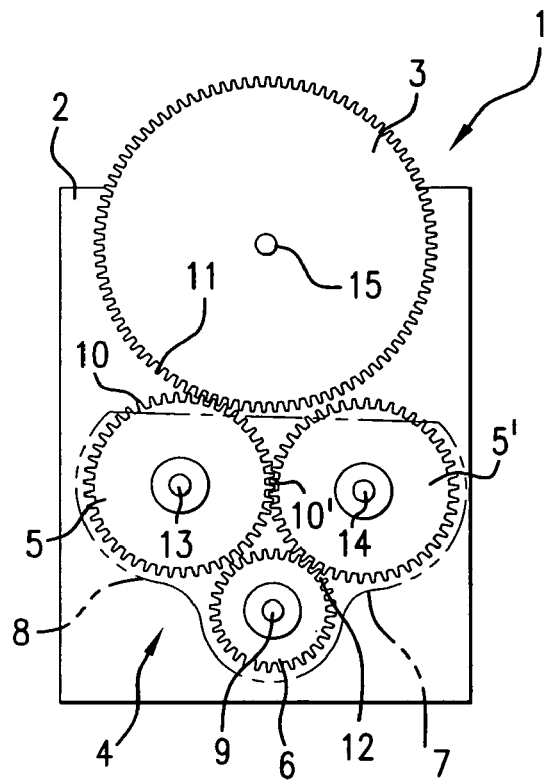
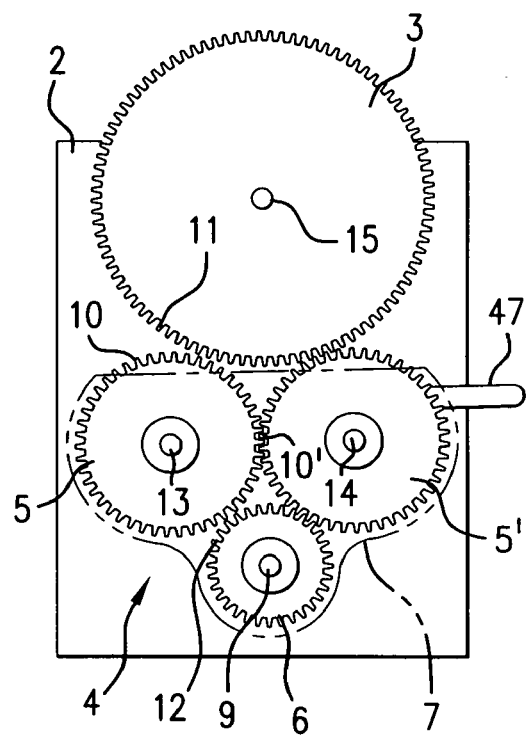
FIG.8  FIG.9
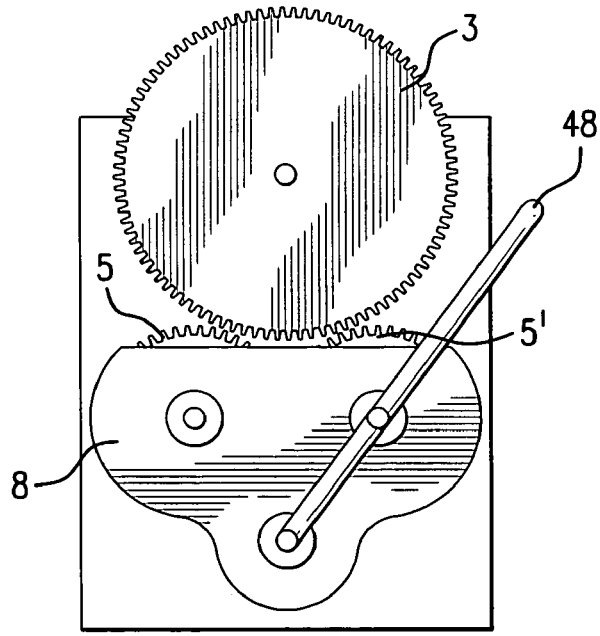
FIG.10

MECHANICAL GEAR APPARATUS

This application claims priority from U.S. Ser. No. 60/998,183 filed Oct. 9, 2007.

BACKGROUND OF THE INVENTION

The mechanical gear apparatus of the instant invention provides for a power transmission wherein a gear that is driven, for example, the gear on a fishing line retrieving mechanism, on a fishing reel, moves only in a forward direction when the driving gear is driven forward or in reverse.

Gear mechanisms are used in many products for obtaining rotational activity with the product. For example, fishing reels, tape recorders, lawn sprinkler heads, power transmissions, for example, automobile transmissions, pump assemblies, for example, pumps used for chemical blending and mixing, and the like.

Many of the devices in use today have reversing mechanisms in them that allows for the reversal of the main driven gear, that is the power output gear.

Some of these mechanisms can be found, for example, in U.S. Pat. No. 3,107,056, issued Oct. 15, 1963 to Hunter in which a sprinkler head for lawn watering is disclosed. This device provides a sprinkler which incorporates a novel turbine-actuated gear drive and a novel reversing means plus a means for adjusting the arc of operation of the sprinkler.

Water pressure is sufficient to overcome the weight of a nozzle block nozzles, and a cover plate so that a sprinkler tube moves readily to an upper position. Rotation of a turbine drives a shaft through a gear train. The gear train is arranged to effect speed reduction so that the shaft turns at a relatively low speed. By reason of the use of overcenter springs and stops, either one or the other of the terminal gears in the apparatus are placed in engagement with the teeth of an internal gear so as to drive the nozzles arcuately in one direction or the other until either a non-adjusting grip lug or an adjustable trip lug engages a trip arm to force the spring past the center, so that the other terminal gear is brought into operation and reverses the direction of rotation of the internal gear and consequently the direction of rotation of the nozzles.

In U.S. Pat. No. 4,337,910, issued on Jul. 6, 1982 to Santoro, there is disclosed a device containing a moving support for tape tensioning for a tape recorder. Such device comprises a train of intermeshed gears supported by an elastically biased moving support which cooperates with a support from the magnetic head and a pinchroller support so as to move from a retracted inoperative position to an advanced operative position, wherein two outer gears of a train of gears are meshed with one of the reel driving toothed members in order to rotate the outer gears of the train in opposite directions to effect a tension in the associated tape being transported between the supply and take-up reels.

Another tape recorder mechanism is disclosed in U.S. Pat. No. 4,723,184, that issued on Feb. 2, 1988 to Takai, et al, in which a gear driving mechanism for driving a power cam for a tape recorder, in which a power cam that drives working elements by its normal rotation is driven by a motor, and the rotation direction of the motor is reversed for the purpose of loading, ejection, and the like. There is used a pivoting gear, pivoting depending on the rotation direction of the motor which is disposed at the motor side, and a normal gear and a reverse rotation gear engaging with each other which are disposed at the gear side. The pivoting gear at the motor side is engaged with one of the normal and the reverse rotation gears when the motor rotates in the normal direction, and with the other when it is pivoted by the reversal of the rotation of the motor. In this case, it is the pivoting gear that is moved, not the entire gear assembly as in the instant invention.

U.S. Pat. No. 4,924,573, that issued on May 15, 1990 to Huddleston deals with a pruner with a power driven extension wherein all of the gears are stationary and do not have a reversing motion except when the entire gear train is reversed.

U.S. Pat. No. 7,181,996 that issued on Feb. 27, 2007 and U.S. Pat. No. 5,058,463, that issue on Oct. 22, 1991 both deal with similar devices. U.S. Pat. No. 5,058,463 deals with a device that is a ratchet wrench having a handle through which a rotatable shaft extends. A bevel gear is coupled to one end of the rotatable shaft for rotating the shaft about an input drive axis. A pair of concentrically aligned ring gears are coupled to the bevel gear for counter rotation of the ring gears by the bevel gear about an output drive axis perpendicular to the input drive axis, while the '996 patent deals with a ratchet wrench that includes a handle having an internal gear formed in a head. It has two annular members rotatably received in the head and each has an internal gear, a stem rotatably engaged in the handle and a pinion for engaging with and for rotating the annular members relative to the head. In addition, a shank is rotatably engaged in the head and includes four spring biased pawls each having one or more teeth for engaging with and for controlling the driving direction of the shank by the head or the annular member and the stem.

Thus, it can be observed that none of the prior art discloses or makes obvious the instant invention.

BRIEF DESCRIPTION OF THE DRAWINGS

FIG. 8 is a full top view of another embodiment of this invention wherein the drive gear is always engaged with the directional gear 5'.

FIG. 9 is a full top view of another embodiment of this invention wherein the drive gear is always engaged with the directional gear 5'.

FIG. 10 is a top view of a device of this invention showing a lever that moves the common carrier to provide a transmission.

THE INVENTION

Figure 1:
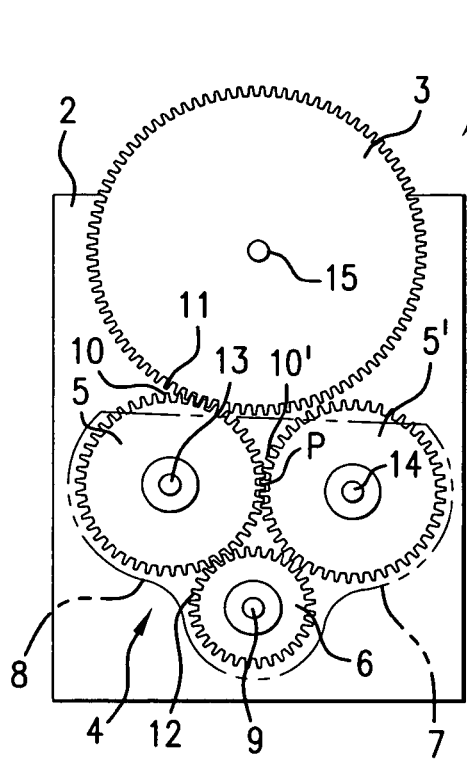
FIG. 1 is a full top view of a gear assembly of this invention showing the engagement of one of the directional gears 5 with the drive gear.

What is disclosed and claimed herein is a mechanical gear apparatus comprising a support base, a drive gear, and, a directional gear assembly comprising three gears.

In a second embodiment, there is a mechanical gear apparatus comprising a support base, a driven gear, and a directional gear assembly comprising two directional gears and a drive gear.

In a third embodiment, there is a mechanical gear apparatus comprising the components of the first and second embodiments, and in addition, there is a positive engagement component mounted on the common carrier that positively engages the gears.

In a fourth embodiment, there is a mechanical apparatus wherein all of the gears have been replaced with rubber rollers having smooth surfaces.

In a fifth embodiment, there is a mechanical apparatus as set forth in the fourth embodiment wherein the surface of the rubber rollers is not smooth.

In a sixth embodiment, there is a mechanical gear apparatus as set forth in the first, second, and third embodiments wherein the gears have in addition, a means to move the common carrier to provide a transmission.

In a seventh embodiment, there is a mechanical apparatus as set forth in the fourth and fifth embodiments wherein the rubber rollers have in addition, a means to move the common carrier to provide a transmission.

In the first embodiment, the three gears are mounted on a common carrier. The common carrier consists of two plates on each side of the directional gear assembly and the directional gear assembly is comprised of three gears, consisting of two directional gears and one driven gear.

The common carrier is mounted on the support base by a first axle through each of the plates, the driven gear and the support base. The directional gear assembly is partially rotatable around the first axle. The drive gear and the directional gear assembly operate on a common plane, that is, they are aligned with each other on the same plane.

The directional gear assembly consists of a first directional gear and a second directional gear mounted adjacent to each other in combination with a driven gear. When at rest, or in motion, one of the directional gears is in driving engagement with the driven gear and the other directional gear is in driving engagement with the drive gear.

The first and second directional gears have constant driving engagement with each other such that when the first directional gear is in driving engagement with the drive gear, the second directional gear is in driving engagement with the driven gear and when the second directional gear is in contact with the drive gear, the second directional gear is in driving contact with the driven gear.

Each of the directional gears is rotatably mounted on a second and a third axle, respectively, the second and third axles being mounted through each plate of the common carrier. In this embodiment, the driven gear is always drivable in the same direction.

In the second embodiment, there is a mechanical gear apparatus comprising a support base, a driven gear, and, a directional gear assembly comprising three gears, wherein the three gears are mounted on a common carrier. The common carrier consists of two plates on each side of the directional gear assembly. The directional gear assembly is comprised of three gears, consisting of two directional gears and one drive gear. The common carrier is mounted on the support base by a first axle through each of the plates, the drive gear and the support base. The directional gear assembly is partially rotatable around the first axle. The drive gear and the directional gear assembly operate on a common plane.

The directional gear assembly consists of a first directional gear and a second directional gear mounted adjacent to each other in combination with a drive gear wherein at rest, or in motion, one of the directional gears is in driving engagement with the drive gear and the other directional gear is in driving engagement with the driven gear. The first and second directional gears have constant driving engagement with each other such that when the first directional gear is in driving engagement with the driven gear, the second directional gear is in driving engagement with the drive gear and when the second directional gear is in contact with the driven gear, the second directional gear is in driving contact with the drive gear, each said directional gear being rotatably mounted on a second and a third axle, respectively. The second and third axles are mounted through each plate of the common carrier.

A third embodiment of this invention is a mechanical gear apparatus described just Supra, in which there is also present, a mechanism to retain the common carrier in a fixed position.

A fourth embodiment of this invention is a mechanical gear apparatus described just Supra, in which there is also present, a mechanism to mechanically shift the common carrier from side to side around an axis.

DETAILED DESCRIPTION OF THE INVENTION

Figure 2:
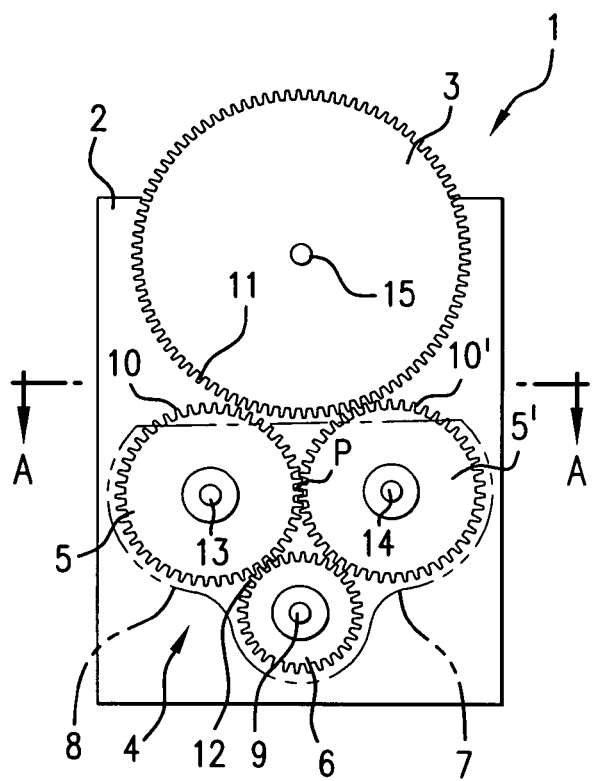
FIG. 2 is a full top the gear assembly of FIG. 1 in which the other directional gear is engaged with the drive gear.

Turning now to FIGS. 1 and 2, there is shown a mechanical gear apparatus 1 of this invention. The gear apparatus 1 is comprised of a support base 2, a drive gear 3, and a directional gear assembly 4.

Figure 3:
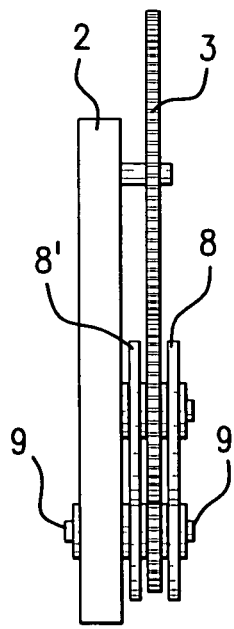
FIG. 3 is a full side view of the gear assembly of this invention.
Figure 4:
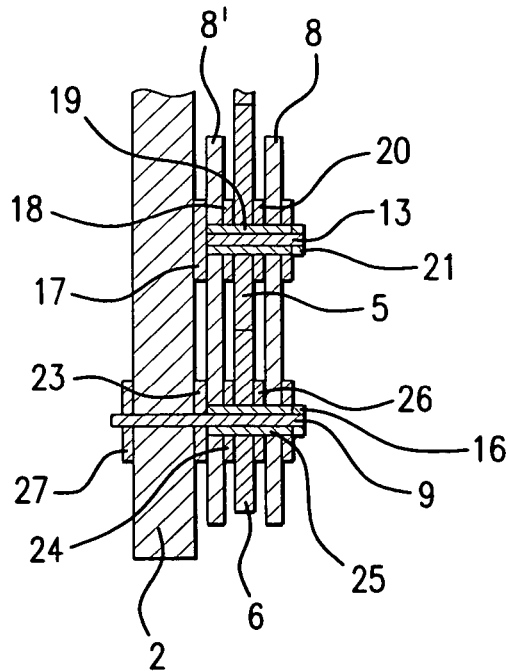
FIG. 4 is an enlarged cross sectional view through line A-A of FIG. 2 of a portion of the gear assembly showing the bearings and supports.
Figure 5:
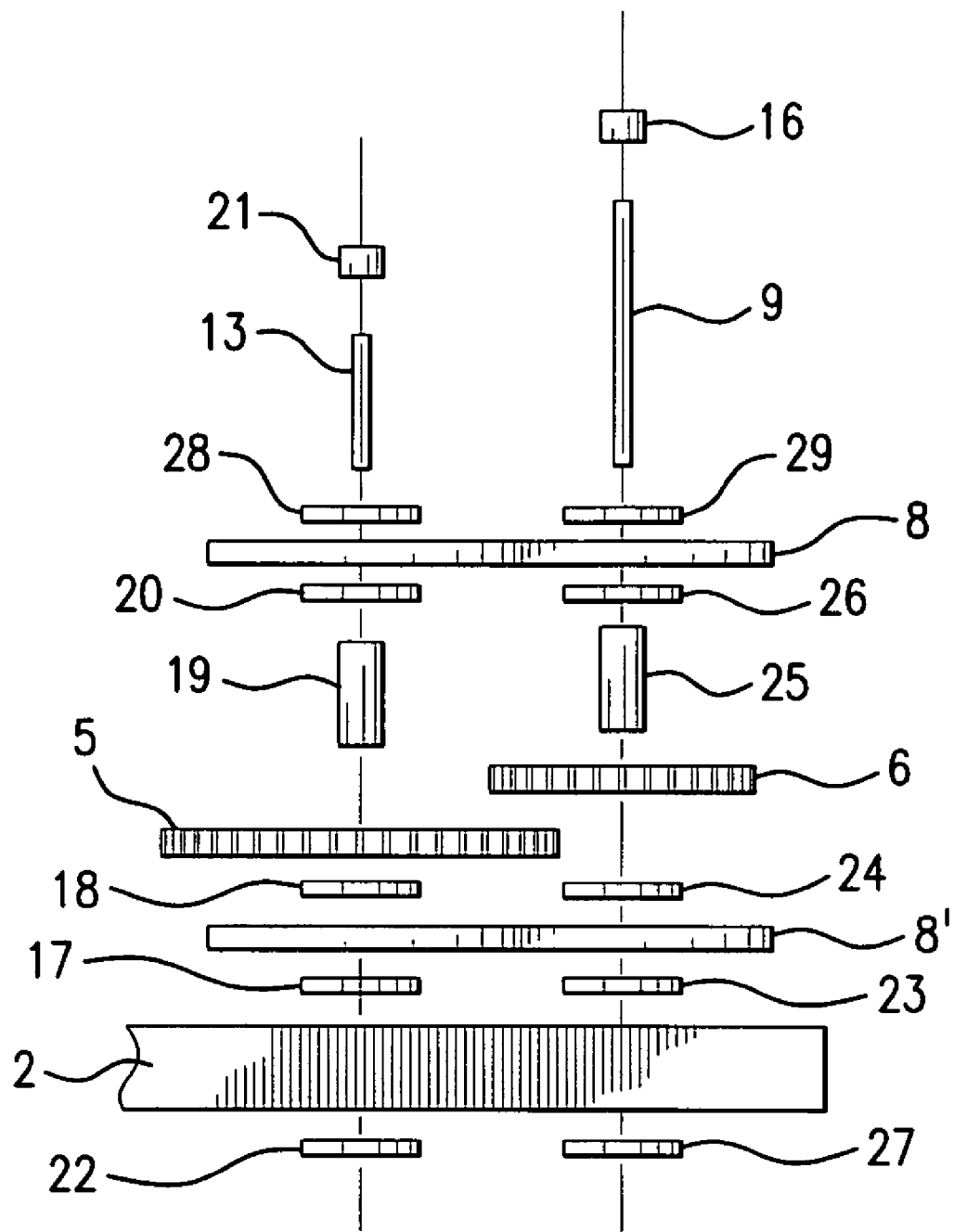
FIG. 5 is an exploded view of a gear assembly in order to show more clearly the various components.

The directional gear assembly 4 comprising three gears, two directional gears 5 and 5' and a driven gear 6, and the gears are mounted on a common carrier 7, that consists of two plates 8 and 8' on either side of the three gears (see also FIGS. 3, 4, and 5).

The common carrier 7 is mounted on the support base 2 by a first axle 9 which extends through each of the plates 8 and 8', the driven gear 6, and the support base 2. The directional gear assembly 4 is partially rotatable around the first axle 9. What is meant in this specification by "partially rotatable" is that the directional gear assembly 4 is not fully rotatable 360° around the first axle 9, but is restricted. The directional gear assembly 4 rotates around the first axle such that it can move directional gears 5 and 5' such that when the first direction gear 5' engages the drive gear 3, directional gear 5 does not engage the drive gear 3, and conversely, when directional gear 5' does engage the drive gear 3, the directional gear 5 does engage the drive gear 3. This movement is very limited and is limited to the amount of distance that is required to engage or disengage the teeth 10 and 10' of the directional gages 5 and 5' with the teeth 11 of the drive gear 3.

As can be observed from the Figures, the directional gears 5 and 5' are always engaged with each other at point P. As can be further observed from the Figures, directional gear 5 is always engaged with the driven gear 9 through teeth 10 of the directional gear 5 and the teeth 12 of the driven gear 3. Thus, driven gear 9 is always driven in the same direction, irregardless of the direction of the movement of the drive gear 3.

Thus, at rest, or in motion, one of the directional gears 5 or 5' is in driving engagement with the driven gear 6 and the other directional gear 5 or 5' is in engagement with the drive gear 3.

The directional gears 5 (second directional gear) and 5' (first directional gear) are in constant driving engagement with each other such that when the first directional gear 5' is in driving engagement with the drive gear 3, the second directional gear 5 is in driving engagement with the driven gear 6.

The second directional gear 5 is mounted on an independent axle 13 and the first directional gear 5' is mounted on an independent axle 14. These two axles, 13 and 14 are not mounted in any fashion to the support base 2 as any means for doing this would result in the inability of the common carrier 7 to move as it needs to move during use. The axles 13 and 14 are mounted to the common carrier 7 by insertion through both plates 8 and 8'.

Likewise, the drive gear 3 is mounted to the support base 2 by an independent axle 15.

Turning now to FIGS. 4 and 5, there is showing in FIG. 4 an enlarged side view of that portion of the mechanical gear apparatus 1 that is the common carrier 7 and associated gears and support apparatus. Thus, there is shown the top plate 8, the bottom plate 8' of the carrier, the axle 13 for the directional gear 5 and the axle 9 for the driven gear 6.

There is a fastening device 16 for the axle 9, although, it is contemplated within the scope of this invention that the axle 9 can be threaded into the support base 2. In addition, there are low friction spacer rings around each of the axles 13 and 9, for example, around axle 13, and at the bottom there is spacer ring 17 below the bottom plate 8', the spacer ring 18 above the bottom plate 8', the bearing 19 for the directional gear 5, the top plate 8, the spacer ring 20 for axle 13, top spacer ring 28, and optionally, a means 21 and 22 for fastening the axle 13 in place in the plates 8 and 8'.

Likewise, for axle 9, there is shown a bottom spacer ring 23, the bottom plate 8', the top spacer ring 24, the bearing 25, the top plate 8, the spacer ring 26, top spacer ring 29, and optionally, a fastening means 16 and 27 for the axle 9.

Now, for purposes of discussion herein, the various components have been given descriptions and names for a clear understanding of how the mechanical gear assembly operates in one mode.

In another mode, the second embodiment of this invention, the drive gear 3 can be the driven gear (3'), and the driven gear 6 can be the driving gear (6').

It is contemplated within the scope of this invention that the mechanical gear assembly 1 can be combined with other gear configurations to create a myriad of different working conditions. Thus, when the driving gear 6' is driven in one direction, for example, in the clockwise direction, the directional gear 5 is driven in a counterclockwise direction, and the driven gear 3' is driven in a clockwise direction. When the driving gear 6' is driven in the opposite direction, for example, the counter clockwise direction, the directional gear 5 is driven in the clockwise direction, thus causing the directional gear 5' to move in a counter clockwise direction which causes the driven gear 3' to drive in the clockwise direction.

Just by changing the direction of the driving gear 6', the driven gear 3' can be forward moving, or can be in a reverse mode.

For purposes of this invention, FIGS. 1 and 2 show one gear assembly contemplated within the scope of this invention wherein the driven gear 6 is always engaged with the directional gear 5, however, it is also contemplated within the scope of this invention to have the driven gear 6 always engaged with the directional gear 5', see for example FIGS. 8 and 9.

The inventors herein believe that the best configuration for the teeth in the gears of the mechanical gear assembly 1 are more pointed, sharpened teeth, so that the gears can more readily reach the adjacent gears and engage readily therewith. Blunter teeth, for example, those with truncated points tend to engage less readily and may cause jumping of the gears.

It is contemplated within the scope of this invention to provide a mechanism for keeping the common carrier fixed in one position, and that can be for example, a simple push button 47, shown in FIG. 9. This button 47 can be a pressure button such that the common carrier can be held for a temporary period of time, or this button can be associated with a locking mechanism so that the common carrier can be locked into position for indefinite periods of time.

It is also contemplated within the scope of this invention to provide a shifting mechanism for the common carrier such that the common carrier can be mechanically shifted from one position engaging the directional gear 5, to another position engaging the directional gear 5'.

Figures 6, 7:
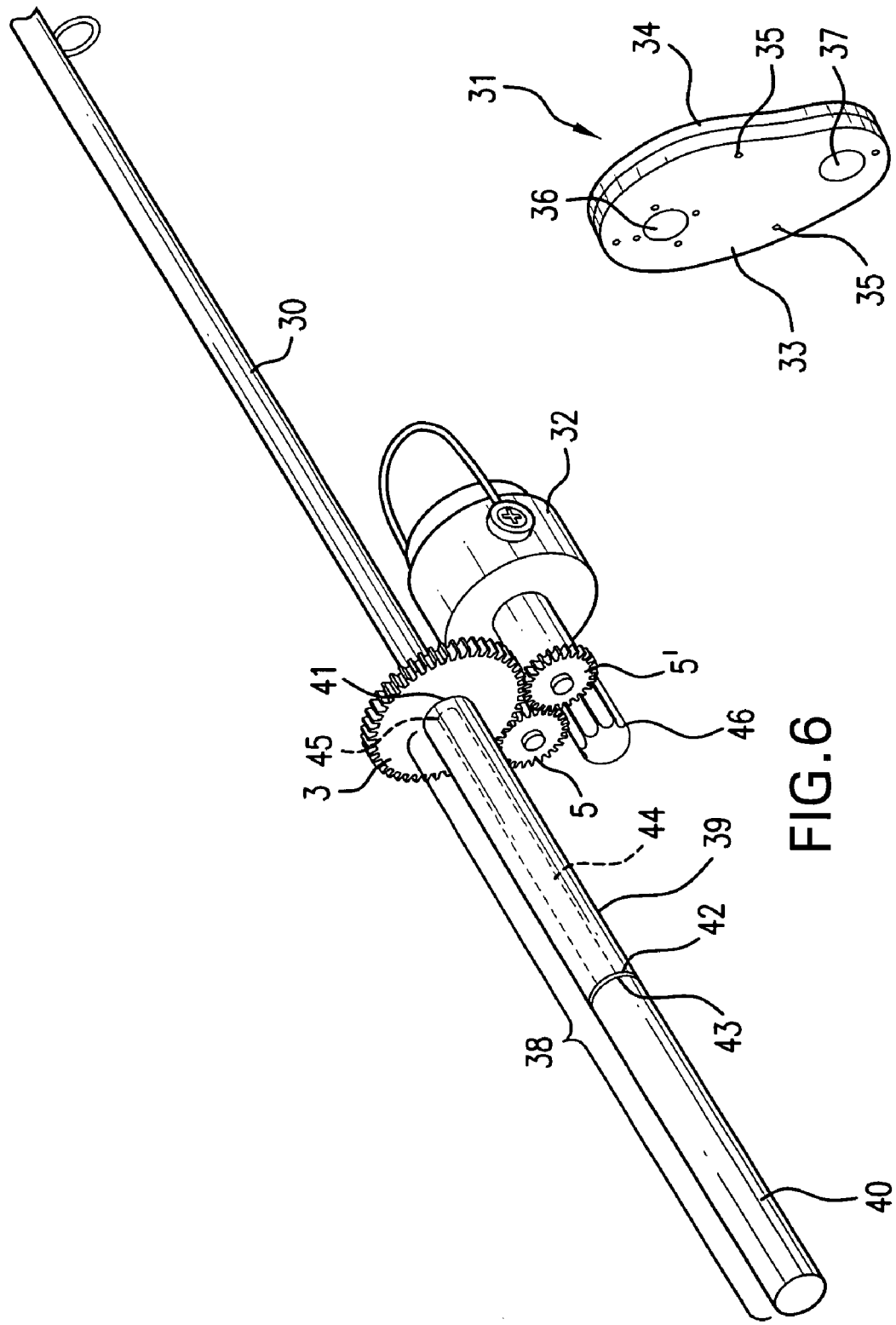
FIG. 6 is view in perspective of a fishing pole and reel with the gear assembly of this invention mounted thereon.
FIG. 7 is a view in perspective of the housing for the gear assembly as shown in FIG. 6.
Figure 11A:
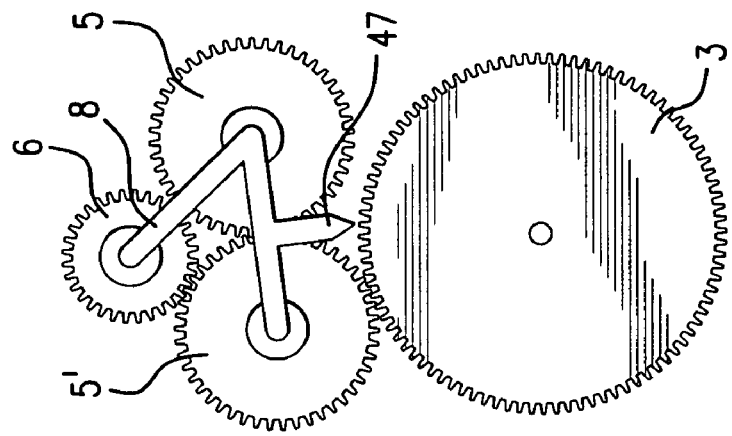
FIG. 11A is a top view of a device of this invention showing the positive engagement device 47 mounted on the common carrier wherein the gear mechanism is in a drive mode, counterclockwise.
Figure 11B:
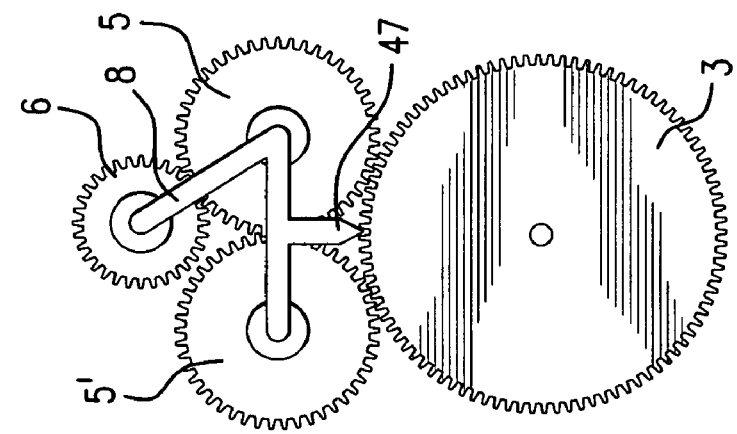
FIG. 11B is a top view of a device of this invention showing the positive engagement device 47 mounted on the common carrier wherein the gear mechanism is in a neutral, non-drive, mode.
Figure 11C:
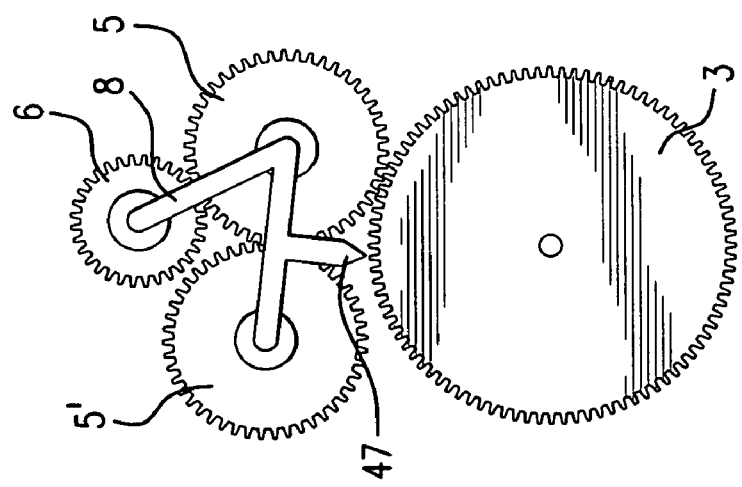
FIG. 11C is a top view of a device of this invention showing the positive engagement device 47 mounted on the common carrier wherein the gear mechanism is in a drive mode, clockwise.
Figure 12C:
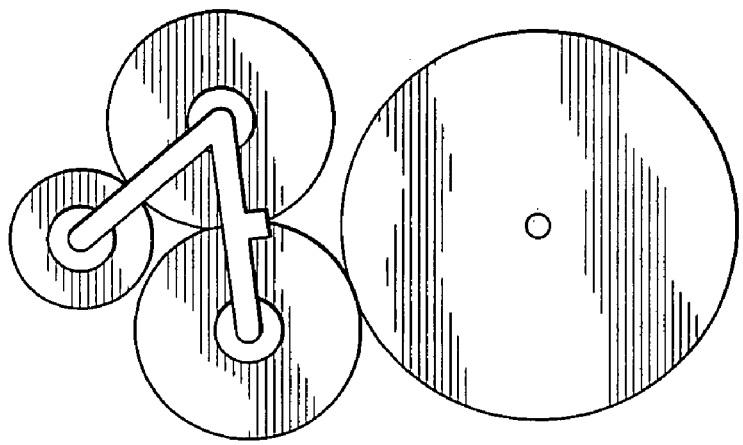
FIG. 12C is a top view of a device of this invention showing all rubber rollers replacing the gears wherein the rubber roll mechanism is in a drive mode, clockwise.
Figure 12B:
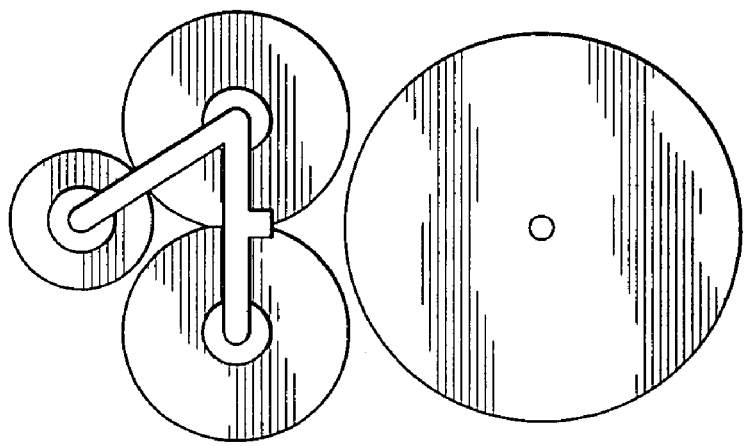
FIG. 12B is a top view of a device of this invention showing all rubber rollers replacing the gears wherein the rubber roll mechanism is in a neutral drive mode.
Figure 12A:
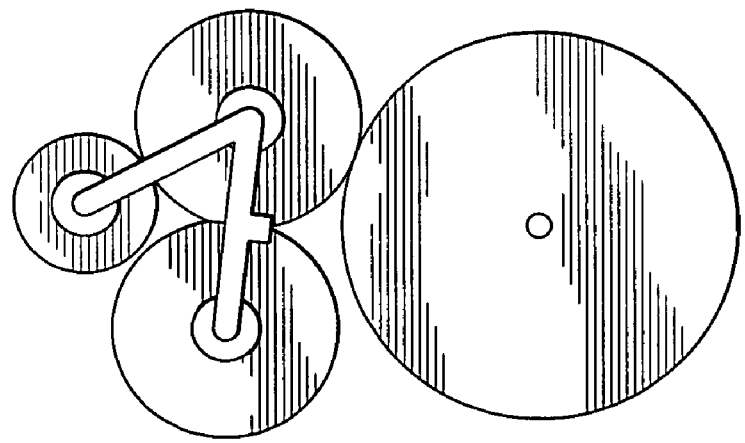
FIG. 12A is a top view of a device of this invention showing all rubber rollers replacing the gears wherein the rubber roll mechanism is in a drive mode counterclockwise.
Figure 13:
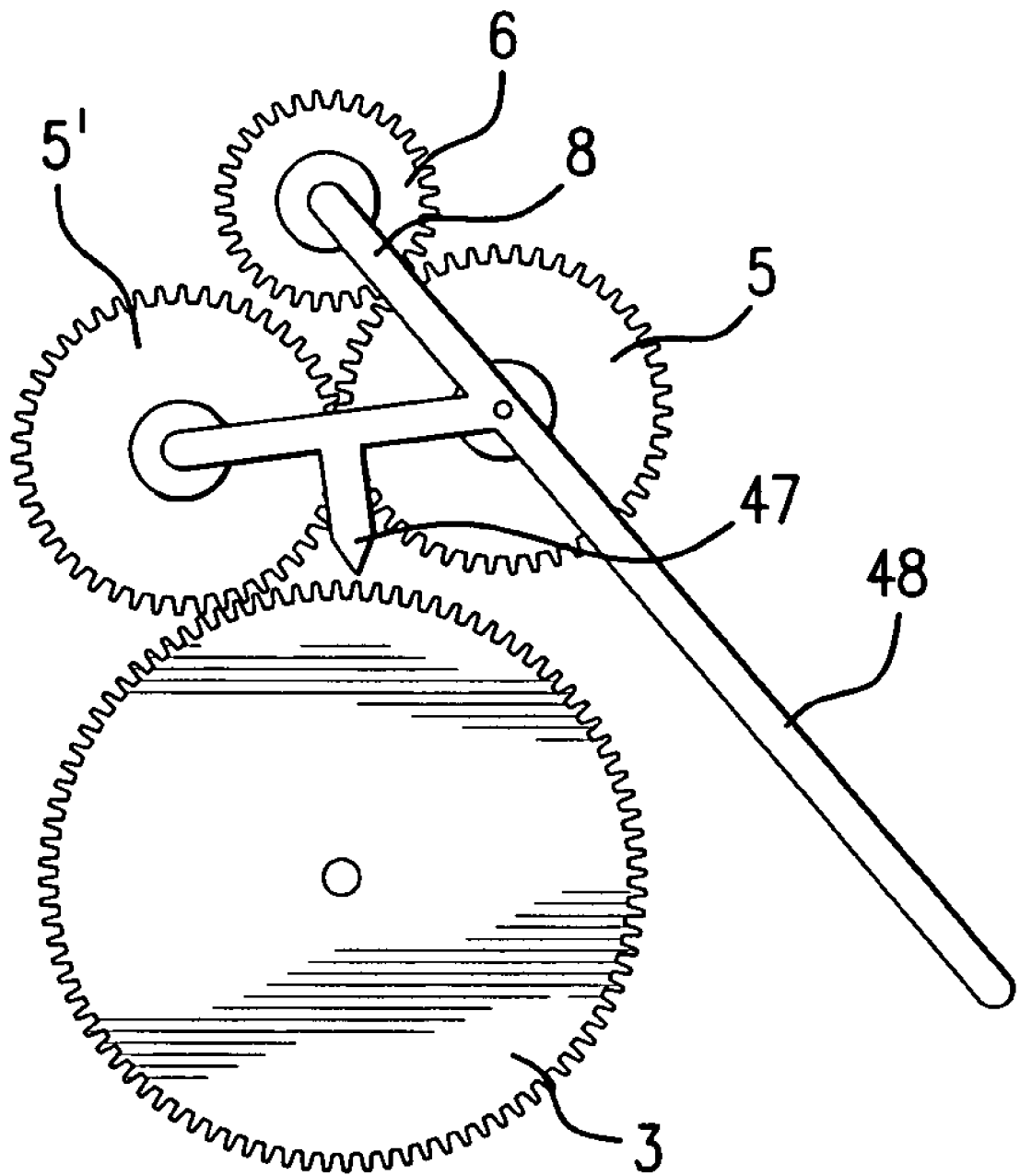
FIG. 13 is a top view of a device of FIG. 11C showing, in addition, a lever that moves the common carrier to provide a transmission.

Another application of this invention can be found in FIG. 6, wherein there is shown a mechanical gear assembly 1 of this invention (without the common carrier 7 for clarity) showing the first directional gear 5', the second directional gear 5, the drive gear 3, mounted on a fishing pole 30 having a reel 32.

In FIG. 7, there is shown a housing 31 for the gear assembly 1 that is comprised of two halves, the front half 33 and the back half 34, that is joined together by fasteners 35, such as bolts or screws The front half 33 has two openings in it, namely, a top opening 36 and a bottom opening 37. When the two halves 33 and 34 are joined together around the gear assembly 1, to form the housing 31, the housing 31 completely encloses the gear assembly 1. For purposes of clarity, the housing 31 is shown independently of the gear assembly 1 in FIG. 7.

As shown in FIG. 6, the handle 38 of the fishing pole 30 is comprised to two pieces, the fixed handle 39 and the rotatable handle 40. The fixed handle 39 has a near end 41 and a distal end 42, and the near end 42 is fixedly attached directly to the housing 31 over and surrounding the top opening 36. The distal end 42 of the fixed handle 39 lays adjacent to, but not attached to, the near end 43 of the rotatable handle 40.

The rotatable handle 40 has a projecting rod 44 that is centered in, and affixed to, the near end 43 thereof. The projecting rod 44 (shown in phantom) has a distal end 45 that is fixedly attached to the drive gear 3. In use, the rotatable handle 40 and the fixed handle 39 are each clutched in a hand of the user, and the two handles are rotated in opposite directions, or more succinctly, the fixed handle 39 is held rigid, and the rotatable handle 40 is twisted left and right to move the drive gear 3.

The reel 32 can be any standard reel that can be attached to the drive gear, and shown in FIG. 6 is an open-faced spinning reel whose drive shaft (not shown) is mounted such that it directly projects out the back of the reel and thus accommodates easy attachment to the axle of the driven gear 3.

FIG. 6 does not shown the driven gear 3, because there is mounted in front of the driven gear 3, a clutch adjustment button 46 that can be used to place drag on the operation of the driven gear 3, and thus place drag on the line being reeled in on the reel 32.

It is contemplated within the scope of this invention to use the gear assembly 1 in many different applications, for example, automobile transmissions, especially with a mechanical gear shifting component, tools, such as ratchet type wrenches, lawnmowers, and the like, wherever gearing mechanisms are needed.

To the inventors knowledge, there are no limitations on the size of each of the gears, no limitation on the ratios of the gears to each other and such sizes and ratios are dependent on the job that the mechanical gear assembly is designed to undertake.

The gears can be manufactured from any convenient material, such as plastics and metals.

What is claimed is:

1. A mechanical gear apparatus comprising:
   (A) a support base;
   (B) a drive gear, and,
   (C) a directional gear assembly comprising three gears, wherein the three gears are mounted on a common carrier, the common carrier consisting of two plates on each side of the directional gear assembly, the directional gear assembly comprised of said three gears, consisting of two directional gears and one driven gear, the common carrier being mounted on the support base by a first axle through each of the plates, the driven gear and the support base, whereby the directional gear assembly is partially rotatable around the first axle, the drive gear and the directional gear assembly operating on a common plane;
   the two directional gears including a first directional gear and a second directional gear mounted adjacent to each other in combination with said driven gear wherein at rest, or in motion, one of the directional gears is in driving engagement with the driven gear and the other directional gear is in driving engagement with the drive gear;
   the first and second directional gears having constant driving engagement with each other such that when the first directional gear is in driving engagement with the drive gear, the second directional gear is in driving engagement with the driven gear and when the second directional gear is in contact with the drive gear, the second directional gear is in driving contact with the driven gear, each said directional gear being rotatably mounted on a second and a third axle, respectively, the second and third axles being mounted through each plate of the common carrier; the driven gear always drivable in the same direction.

2. The mechanical gear apparatus as claimed in claim 1 that is manufactured from plastics.

3. The mechanical gear apparatus as claimed in claim 1 wherein the gears are manufactured from plastics.

4. The mechanical gear apparatus as claimed in claim 1 that is manufactured from metal.

5. The mechanical gear apparatus as claimed in claim 1 wherein the gears are manufactured from metal.

6. A fishing reel that contains a mechanical gear apparatus as claimed in claim 1.

7. An automotive transmission that contains a mechanical gear apparatus as claimed in claim 1.

8. An automotive transmission that contains a mechanical gear apparatus as claimed in claim 1 wherein, in addition, there is a mechanical means for shifting the mechanical gear apparatus.

9. An automotive transmission that contains a mechanical gear apparatus as claimed in claim 1 wherein, in addition, there is a mechanical means for shifting the mechanical gear apparatus that is electronically controlled.

10. A device that is electronically controlled having a mechanical gear apparatus as claimed in claim 1.

11. A hand tool that contains a mechanical gear apparatus as claimed in claim 1.

12. A lawnmower that contains a mechanical gear apparatus as claimed in claim 1.

13. An electronic device that contains a mechanical gear apparatus as claimed in claim 1.

14. A mechanical gear apparatus comprising:
    (A) a support base;
    (B) a driven gear, and,
    (C) a directional gear assembly comprising three gears, wherein the three gears are mounted on a common carrier, the common carrier consisting of two plates on each side of the directional gear assembly, said directional gear assembly, consisting of two directional gears and one drive gear, the common carrier being mounted on the support base by a first axle through each of the plates, the drive gear and the support base, whereby the directional gear assembly is partially rotatable around the first axle, the drive gear and the directional gear assembly operating on a common plane;
    the two directional gears including a first directional gear and a second directional gear mounted adjacent to each other in combination with said drive gear wherein at rest, or in motion, one of the directional gears is in driving engagement with the drive gear and the other directional gear is in driving engagement with the driven gear;
    the first and second directional gears having constant driving engagement with each other such that when the first directional gear is in driving engagement with the driven gear, the second directional gear is in driving engagement with the drive gear and when the second directional gear is in contact with the driven gear, the second directional gear is in driving contact with the drive gear, each said directional gear being rotatably mounted on a second and a third axle, respectively, the second and third axles being mounted through each plate of the common carrier.

15. The mechanical gear apparatus as claimed in claim 14 that is manufactured from plastics.

16. The mechanical gear apparatus as claimed in claim 14 wherein the gears are manufactured from plastics.

17. The mechanical gear apparatus as claimed in claim 14 that is manufactured from metal.

18. The mechanical gear apparatus as claimed in claim 14 wherein the gears are manufactured from metal.

19. A fishing reel that contains a mechanical gear apparatus as claimed in claim 14.

20. An automotive transmission that contains a mechanical gear apparatus as claimed in claim 14.

21. An automotive transmission that contains a mechanical gear apparatus as claimed in claim 14 wherein, in addition, there is a mechanical means for shifting the mechanical gear apparatus.

22. An automotive transmission that contains a mechanical gear apparatus as claimed in claim 14 wherein, in addition, there is a mechanical means for shifting the mechanical gear apparatus that is electronically controlled.

23. A device that is electronically controlled having a mechanical gear apparatus as claimed in claim 14.

24. A hand tool that contains a mechanical gear apparatus as claimed in claim 14.

25. A lawnmower that contains a mechanical gear apparatus as claimed in claim 14.

26. An electronic device that contains a mechanical gear apparatus as claimed in claim 14.

* * * * *